(12) United States Patent
Ricco et al.

(10) Patent No.: US 11,688,077 B2
(45) Date of Patent: Jun. 27, 2023

(54) ADAPTIVE OBJECT TRACKING POLICY

(71) Applicant: GOOGLE LLC, Mountain View, CA (US)

(72) Inventors: Susanna Maria Ricco, Redwood City, CA (US); Caroline Rebecca Pantofaru, San Carlos, CA (US); Kevin Patrick Murphy, Palo Alto, CA (US); David A. Ross, San Jose, CA (US)

(73) Assignee: Google LLC, Mountain View, CA (US)

( * ) Notice: Subject to any disclaimer, the term of this patent is extended or adjusted under 35 U.S.C. 154(b) by 261 days.

(21) Appl. No.: 16/954,153

(22) PCT Filed: Dec. 15, 2017

(86) PCT No.: PCT/US2017/066877
§ 371 (c)(1),
(2) Date: Jun. 15, 2020

(87) PCT Pub. No.: WO2019/117970
PCT Pub. Date: Jun. 20, 2019

(65) Prior Publication Data
US 2021/0166402 A1 Jun. 3, 2021

(51) Int. Cl.
*G06K 9/00* (2022.01)
*G06T 7/20* (2017.01)
(Continued)

(52) U.S. Cl.
CPC ............ *G06T 7/20* (2013.01); *G06F 18/214* (2023.01); *G06N 3/045* (2023.01); *G06N 3/08* (2013.01);
(Continued)

(58) Field of Classification Search
CPC . G06T 7/20; G06T 7/246; G06T 2207/20081; G06T 2207/20084;
(Continued)

(56) References Cited

U.S. PATENT DOCUMENTS

2017/0327138 A1* 11/2017 Jordan .................... H04N 7/18

OTHER PUBLICATIONS

Andre Cohen, Reinforcement Learning for Robust and Efficient Real-World Tracking, IEEE, 2010.*
(Continued)

*Primary Examiner* — Xin Jia
(74) *Attorney, Agent, or Firm* — Fish & Richardson P.C.

(57) ABSTRACT

Methods, systems, and apparatus, including computer programs encoded on computer storage media, for implementing a machine-learned object tracking policy. One of the methods includes receiving a current video frame by a user device having a plurality of installed object trackers, wherein each object tracker is configured to perform a different object tracking procedure on the current video frame rent video frame. The current video frame and one or more object tracks previously generated by the one or more object trackers are provided as input to a trained policy engine that implements a reinforcement learning model to generate a particular object tracking plan. A particular object tracking plan is selected based on the output of the reinforcement learning model, and the selected object tracking plan is performed on the current video frame to generate one or more updated object tracks for the current video frame.

20 Claims, 4 Drawing Sheets

(51) Int. Cl.
    *G06N 3/08*     (2023.01)
    *G06T 7/246*    (2017.01)
    *G06F 18/214*   (2023.01)
    *G06N 3/045*    (2023.01)

(52) U.S. Cl.
    CPC .... *G06T 7/246* (2017.01); *G06T 2207/20081* (2013.01); *G06T 2207/20084* (2013.01)

(58) Field of Classification Search
    CPC ...... G06K 9/6256; G06N 3/0454; G06N 3/08; G06N 3/006
    See application file for complete search history.

(56) References Cited

OTHER PUBLICATIONS

Luka Cehovin, Visual object tracking performance measures revisited, IEEE, Mar. 7, 2016.*

Cehovin et al., "Visual Object Tracking Performance Measures Revisited", IEEE Transaction on Image Processing, Mar. 2016, 25(3):1261-1274.

Choi et al., "Attentional Correlation Filter Network for Adaptive Visual Tracking", CVPR, Jul. 2017, pp. 4807-4816.

Cohen et al., "Reinforcement Learning for Robust and Efficient Real-World Tracking", International Conference on Pattern Recognition, Aug. 2010, pp. 2989-2992.

Huang et al., "Learning Policies for Adaptive Tracking with Deep Feature Cascades", ICCV, Sep. 2017, pp. 105-114.

PCT International Preliminary Report on Patentability and Written Opinion in International Application No. PCT/US2017/066877, dated Jun. 25, 2020, 12 pages.

PCT International Search Report and Written Opinion in International Application No. PCT/US2017/066877, dated Aug. 2, 2018, 18 pages.

Xiang et al., "Learning to Track: Online Multi-Object Tracking by Decision Making", ICCV, Dec. 2015, pp. 4705-4713.

* cited by examiner

ADAPTIVE OBJECT TRACKING POLICY

BACKGROUND

This specification relates to object tracking in sequences of images, e.g. videos.

Object tracking refers generally to techniques for detecting objects in sequences of images and generating data that represents how the objects move within the images. For example, an object tracking task can involve generating data that represents that a ball moves within the images in a direction from left to right. Object tracking thus involves two tasks: 1) detection of an object, and 2) associating the detection with other detections of the same object. A system or module that performs these two tasks will be referred to as an object tracker.

In this specification, the data that associates detections as being detections of the same object will be referred to as a track. A track can thus represent how an object moves within a sequence of images. For example, a track can indicate the location of an object within each of one or more images in a sequence of images, e.g., using frame coordinates that define a bounding box around the object. Typically an object has an object identifier that is associated with the detected locations of the object within each of the images.

Sophisticated and highly-reliable object trackers can use deep neural networks for object detection. Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer. As an example, a neural network can be used to determine that an image captured by an on-board camera is likely to contain an image of a nearby car.

However, sophisticated object detectors, e.g., implemented using deep neural networks, can incur a very high computational cost. Therefore, on many computing platforms, e.g., mobile user devices including smartphones, it is not feasible to execute such highly sophisticated object detectors on every frame of video, particularly if the object tracking must be performed in real time.

Instead, achieving real-time object tracking typically requires performing computationally cheaper, but less accurate, object trackers at least some of the time. These techniques include object-specific techniques that rely on features from a previous object detection as well as motion models that extrapolate the current motion of a detected object in order to predict a likely next location of the object.

Some object-tracking applications use hand-designed policies in order to determine which object tracker to execute on each incoming image. For example, a hand-designed policy can specify performing a deep neural network tracker on every 10th frame, and performing object-specific trackers otherwise.

However, such hand-designed policies have several drawbacks. First, the performance of any particular policy is highly dependent on the underlying computing platform. In other words, no single hand-designed policy is optimal for all computing platforms. For example, on platforms with more computing power, it may be more optimal to run sophisticated object trackers more often. In addition, developing the hand-designed policies is tedious, time-consuming, and a scalability bottleneck. In other words, if there are 100 different computing platforms to be considered, hand-designed policies must be manually generated for all 100 computing platforms in order to begin to approach optimal object tracking performance. Furthermore, such hand-designed policies typically are unable to consider the current state of the video. For example, if the video is of objects that are not moving, running sophisticated object detectors even periodically may be computationally wasteful relative to simply using motion models.

SUMMARY

This specification describes how to use reinforcement learning techniques to train an object tracking policy for a target computing platform. The object tracking policy can be used to generate and perform an object tracking plan on video frames in real time.

Particular embodiments of the subject matter described in this specification can be implemented so as to realize one or more of the following advantages. Training an object tracking policy provides for more accurate and more efficient object tracking on target computing platforms. This is particularly so when compared to hand-designed policies, which are inaccurate, inefficient, and cannot easily be ported to other target computing platforms. And unlike hand-designed policies, the object tracking policy is able to adapt to the actual content of the video frames, which further serves to maximize accuracy while minimizing required computational resources. Once a training process is established, the training process can be easily repeated automatically for any number of different target computing platforms.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
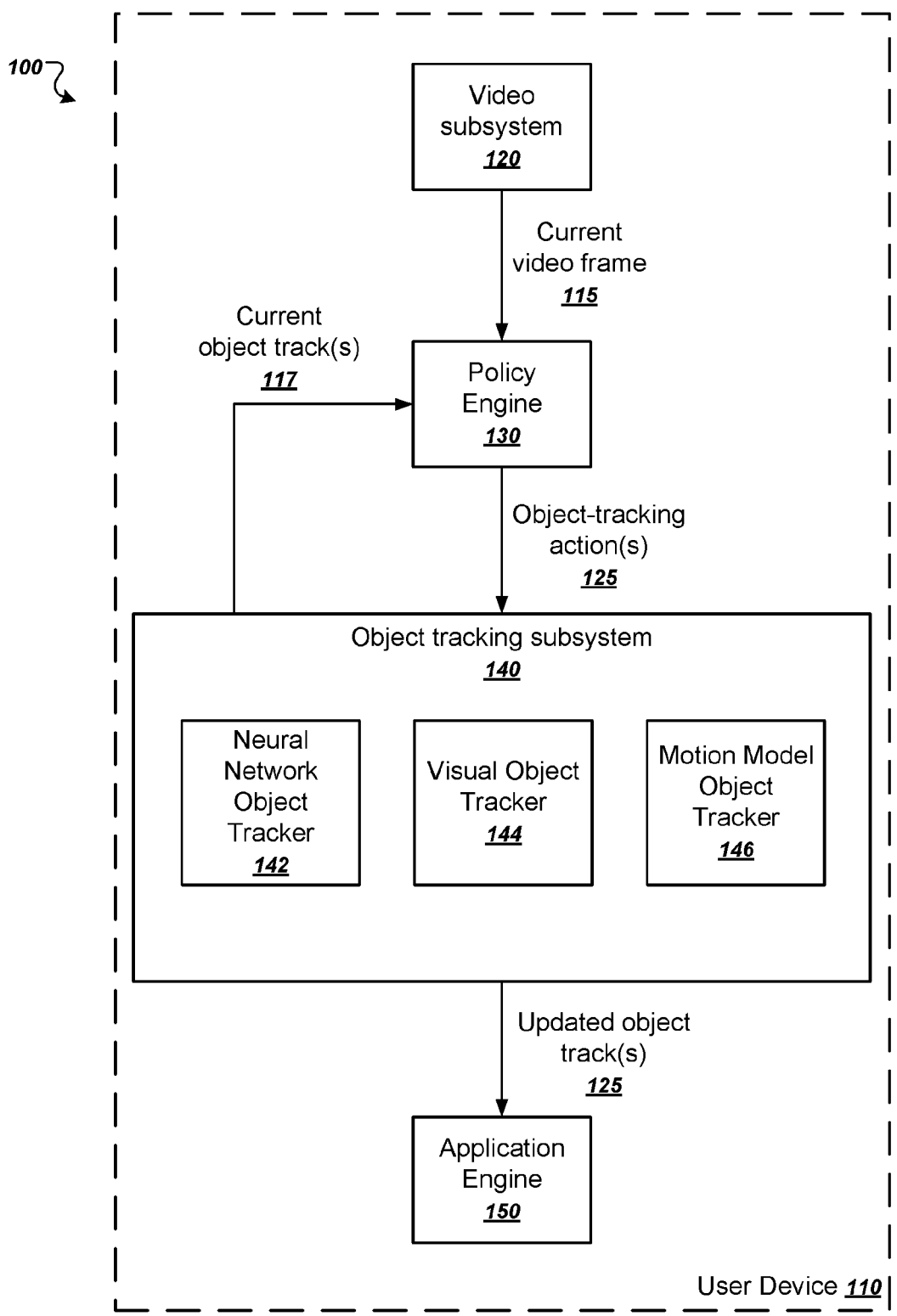
FIG. 1 is a diagram that of an example system.

FIG. 1 is a diagram that of an example system 100. The system 100 includes a user device 110 having an installed video subsystem 120, a policy engine 130, an object tracking subsystem 140, and an application engine 150. Each of these components can be implemented as one or more computer programs. Although illustrated as being installed on a single user device 110, each of these components can be installed on one or more respective computing devices in one or more locations, which can be coupled to each other through any appropriate communications network.

The user device 110 can be any appropriate computing platform having one or more processors and computer-readable media, e.g., a server, a mobile phone, a tablet computer, a notebook computer, a music player, an e-book reader, a laptop or a desktop computer, a PDA, a smart phone, or any other stationary or portable computing device.

Suitable user devices also include any appropriate devices having integrated picture and video capturing capabilities. For example, the user device can be a handheld or stationary camera, a smart home camera, a wearable camera, or an aerial drone, to name just a few examples. The user device 110 can also be a device integrated into an autonomous or semi-autonomous vehicle that is configured to track cars, pedestrians, and other objects in the vicinity of the vehicle.

The video subsystem 120 can capture or obtain sequences of video frames. In this specification, a video frame is visual data captured from a particular time period that can be any appropriate length, although in most real-world applications video frames are typically only fractions of a second in length. A video frame can thus be an image file or other image data generated from image or video data. A video frame need not be represented by any particular video file format. For example, a video frame can also be a single image in a sequence of images. Alternatively or in addition, a video frame can be compressed video data or can be reconstructed from compressed video data. The video subsystem 120 can obtain the video frames in a variety of ways. For example, the video subsystem 120 can capture a video using an integrated or connected camera, or the video subsystem 120 can download a video from another source, e.g., from the Internet. The video subsystem 120 is configured to provide a current video frame 115 to a policy engine 130.

The policy engine 130 can receive the current video frame 115 and one or more current object tracks 117 and can generate one or more object-tracking actions 125. The one or more current object tracks 117 are optional because in some situations no object tracks have yet been established. In this specification, the current video frame and any established object tracks will be referred to as the current state. The current state thus can include track information including one or more bounding boxes and object identifiers for each of the one or more current object tracks. The current state can also optionally include one or more previous video frames that precede the current video frame 115.

Each of the one or more object-tracking actions 125 indicates one or more object trackers to be executed by the object tracking subsystem 140 using the current video frame 115. In this specification, the one or more object tracking actions 125 will collectively be referred to as an object tracking plan. The policy engine 130 can be trained to generate an object-tracking plan that is designed to maximize the quality of object tracking within video frames generated by the video subsystem 120 given the particular characteristics of the computing hardware of user device 110 and the current state.

In this specification, the metric that quantifies the predicted accuracy of object tracking for a particular video frame will be referred to as a cumulative action score. What is considered high-quality object tracking performance is highly dependent upon the computing hardware of the user device 110 as well as the content of the video frames. For devices having more processing power, running highly sophisticated object trackers more often will often provide superior results. For other devices having less processing power, running computationally cheaper object trackers is often better. Computing a measure of quality for object tracking is described in more detail below.

The object-tracking actions 125 need not specify the same object tracker. Rather, in many cases, the object-tracking actions 125 will specify different respective object trackers. In addition, the operating parameters of the object-tracking actions in an object tracking plan also need not be the same. For example, an object tracking plan can specify performing object trackers using different complexity settings, different resolution settings, and on different video frame regions, to name just a few examples.

For example, each of the one or more object-tracking actions 125 generated by the policy engine 130 can specify a different respective region of the video frame on which the corresponding object tracker should be performed. For example, an object tracking plan can specify running a sophisticated object tracker in one region of the image, but a cheaper object tracker in another region of the image. This situation can arise when features of the video frame indicate that something is changing in a particular region of the image relative to one or more previous video frames. To provide a concrete example, a video can initially show two people sitting on a couch. Without any significant movements, performing cheaper object trackers may provide sufficiently accurate object tracking. Subsequently, in the video a door within the video frames may open, and another person may appear in the doorway. At this point, the features of the video frame indicate a change in a particular region of the video frame relative to previous video frames. Therefore, in response the policy engine 130 can generate an object tracking plan having multiple different object-tracking actions: a first action that specifies running a sophisticated object tracker on a region of the video frame corresponding to the newly opened door, and a second action that specifies running cheaper object trackers on a region of the video frame corresponding to the people who remain motionless on the couch.

The policy engine 130 can make such decisions by implementing one or more trained object-tracking policies. Each object-tracking policy, or policy for brevity, can implement a state value function of a reinforcement learning model that defines a mapping between a current state and an object tracking plan, with each candidate plan having a respective cumulative action score. Reinforcement learning is a machine learning discipline that involves training software agents to react to inputs in an environment. Some reinforcement learning agents use neural networks to select the action to be performed in response to receiving a given observation.

The policy engine 130 can be trained to generate object tracking plans that can be performed in real-time. In this context, performing object tracking plans in real time means that an end user would observe no appreciable video frame delays due to performing the object tracking plans on the user device concurrently with rendering the video frames on the user device. Performing the object tracking plans in real time may, but need not necessarily, require performing the entire object tracking plan within a time period defined by the length of a video frame. As described in more detail below, the performance of some object tracking plans can span multiple video frames and are still considered to be real-time because a user would observe no appreciable delays in the rendering of the video frames.

The policy engine 130 can then select an object-tracking plan based on the cumulative action scores and can then provide the selected object-tracking actions 125 of the plan to the object tracking subsystem 140. This process is described in more detail below with reference to FIG. 4.

The object tracking subsystem 140 can receive the one or more object-tracking actions 125 and can execute the one or more object-tracking actions 125 on the current video frame 115. The example object tracking subsystem 140 is illustrated as having three different object trackers: a neural network object tracker 142, a visual object tracker 144, and a motion model object tracker 146. The neural network object tracker 142 uses a deep neural network to perform very sophisticated, but very expensive object detections. The visual object tracker 144 can perform a technique that uses object-specific information to perform cheaper object tracking that is less accurate in some situations. For example, the visual object tracker 144 can implement correlation filters, neural network bounding box regressors, or optical flow-based tracking, to name just a few examples. And the motion model object tracker can relatively cheaply generate an updated object track by extrapolating the motion of objects within the video frames rather than by redetecting the objects. Implementations of the object tracking subsystem 140 can have different object trackers than these, e.g., more or fewer different object trackers. Regardless of which object tracker is selected, the result is one or more updated object tracks 125 that each associate an actual or predicted object detections in the current video frame 115 with previous object detections in previous video frames. The object tracking subsystem 140 can then provide the one or more updated object tracks 125 to an application engine 150.

The application engine 150 can use the one or more updated object tracks 125 for one or more particular application. Example applications include generating object tracks for pictures or video of objects moving through a physical space, e.g., inventory in a warehouse; cars or pedestrians moving around an autonomous vehicle; customers moving through a store; and animals moving in a landscape, to name just a few examples.

Other useful applications include augmented reality applications in which real-world objects are annotated within a viewfinder of an augmented reality device in real-time. In order to perform such augmented reality techniques, the locations of the objects must also be tracked in real-time.

Additional applications for adaptive object tracking include picture and video capturing applications. For example, the user device 110 can use the adaptive object tracking capabilities to maintain focus on the location of a particular object within the video frame, which can be, for example, faces of people within the video frame. If the user device 110 is an aerial drone, for example, the adaptive object tracking techniques can be used to track stationary or moving objects as the drone itself is moving. The user device 110 can also be a device that is configured to automatically begin or continue to capture photos or videos while a tracked object is within the video frame. For example, a smart home camera can be configured to record video when a moving object, e.g., an intruder, is detected within the video frame.

Figure 2:
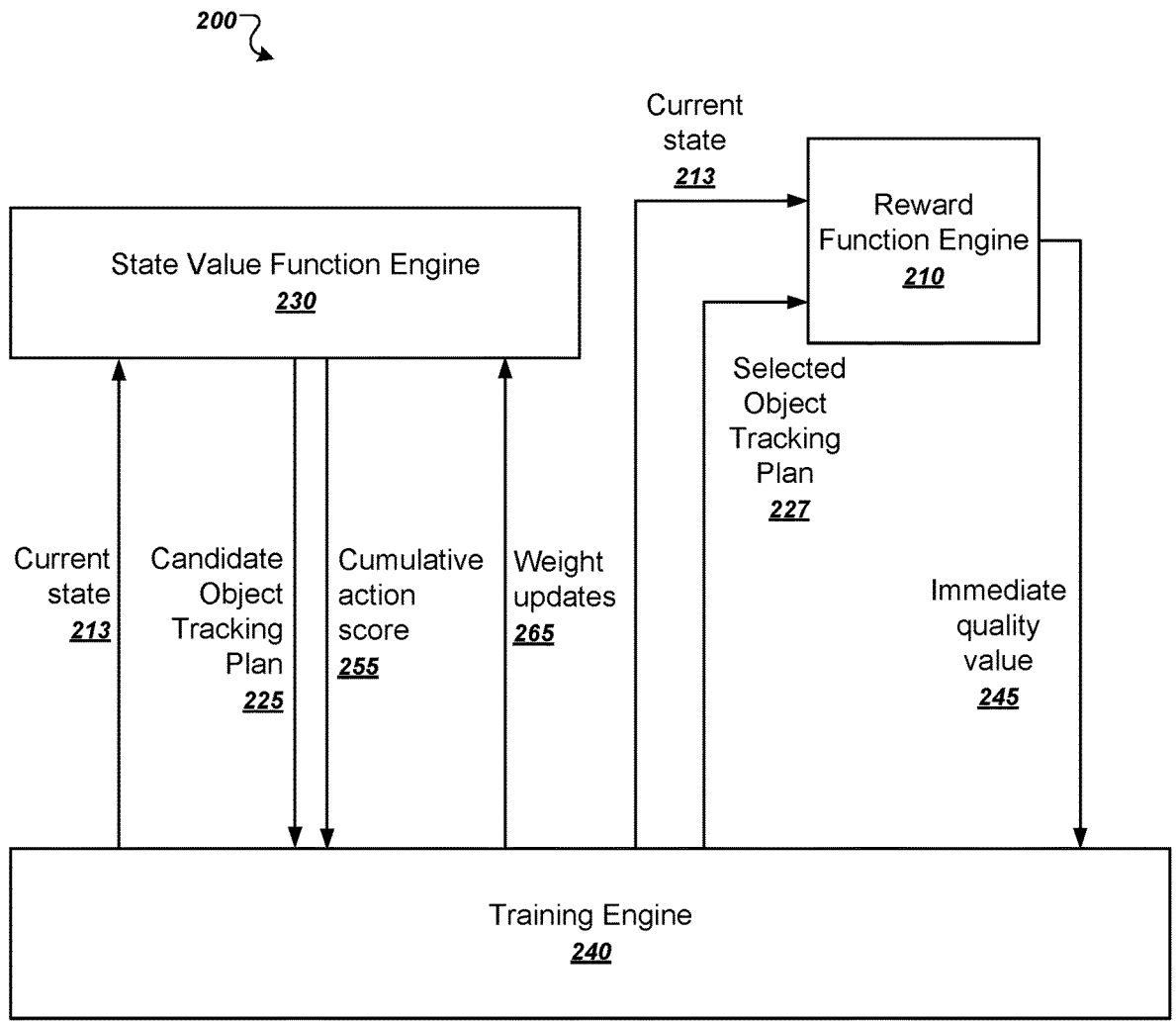
FIG. 2 is a diagram that illustrates the architecture of an example system for training an object-tracking policy.

FIG. 2 is a diagram that illustrates the architecture of an example system 200 for training an object-tracking policy. The system 200 includes the following functional components: a reward function engine 210, a state value function engine 230, and a training engine 240. These components can be implemented as computer programs installed on one or more computers in one or more locations.

In general, a reinforcement learning process can include two stages: (i) an acting stage that generates experience tuples using a current version of a reinforcement model, and (ii) a training stage that updates the reinforcement model using the generated experience tuples. These stages can be coupled, meaning that each experience tuple is used to update the model as soon as it is generated; or the stages can be decoupled, meaning that multiple experience tuples are generated before the model is updated.

During the acting stage, a training engine 240 can generate an experience tuple for a given current state 213. As described above, the current state 213 generally includes a current video frame, data representing any previously generated object tracks, and optionally one or more previous video frames. The training engine 240 can provide the current state 213 to the state value function engine 230. The state value function engine 230 is a machine-learning system that implements a reinforcement learning model.

The state value function engine 230 receives the current state 213 and generates a candidate object tracking plan 225 as well as a respective cumulative action score 255 for the candidate object tracking plan. Each cumulative action score 255 is a prediction of the long-term object tracking quality resulting from performing the object tracking plan in the current state.

The training engine 240 can then select the best candidate object tracking plan 225 for the current state 213, e.g., by selecting the candidate object tracking plan having the highest cumulative action score 255.

The training engine 240 can then use a reward function engine 210 to generate an immediate quality value 245 for the video frame 213 and the selected object tracking plan 227. The reward function engine 210 is a subsystem that generates immediate quality values 245 for a given object tracking plan 227 performed in a current state 213. As described above, the actions that are considered to be high-quality can differ substantially for different computing platforms and for different states. Therefore, the reward function engine 210 can be configured to consider the characteristics of the target computing platform and the characteristics of the current state including the current video frame.

The immediate quality value 245 generally has two primary components: 1) a measure of accuracy, and 2) a measure of computational cost on the target computing platform. In general, the immediate quality value 245 rewards correctly updated object tracks and penalizes errors and rewards low computational costs and penalizes high computational costs. This process is described in more detail below with reference to FIG. 3.

The training engine 240 can then generate an experience tuple using (i) the current state 213, (ii) the selected object tracking plan 227, (iii) the immediate quality value 245 resulting from applying the selected object tracking plan 227 in the current state, and (iv) the predicted next state after performing the selected object tracking plan 227 in the current state 213.

During the training stage, the training engine 240 can use each generated experience tuple to update weights of the state value function engine 230. To do so, the training engine 240 can provide the current state 213 of the experience tuple to the state value function engine 230 to generate a current cumulative action score 255 for the candidate object tracking plan 225 of the experience tuple.

The training engine 240 can then compute a target cumulative action score that should have been generated by the state value function engine 230. To do so, the training engine can use the immediate quality value 245 of the experience tuple and the predicted next state of the experience tuple. In some implementations, the target cumulative score is computed by adding, to the immediate quality value, a discounted estimate for the highest quality score that could be obtained for any candidate object tracking plan. Suitable techniques for computing a target cumulative action score include using a Deep Q Network algorithm, a Double Deep Q Network algorithm, or an actor/critic algorithm.

The training engine 240 can then compute weight updates 265 for the reinforcement model that adjust the current cumulative action score 255 toward the computed target cumulative action score, e.g., using gradient descent techniques. The training engine can then update the state value function engine 230 using the computed weight updates 265.

Figure 3:
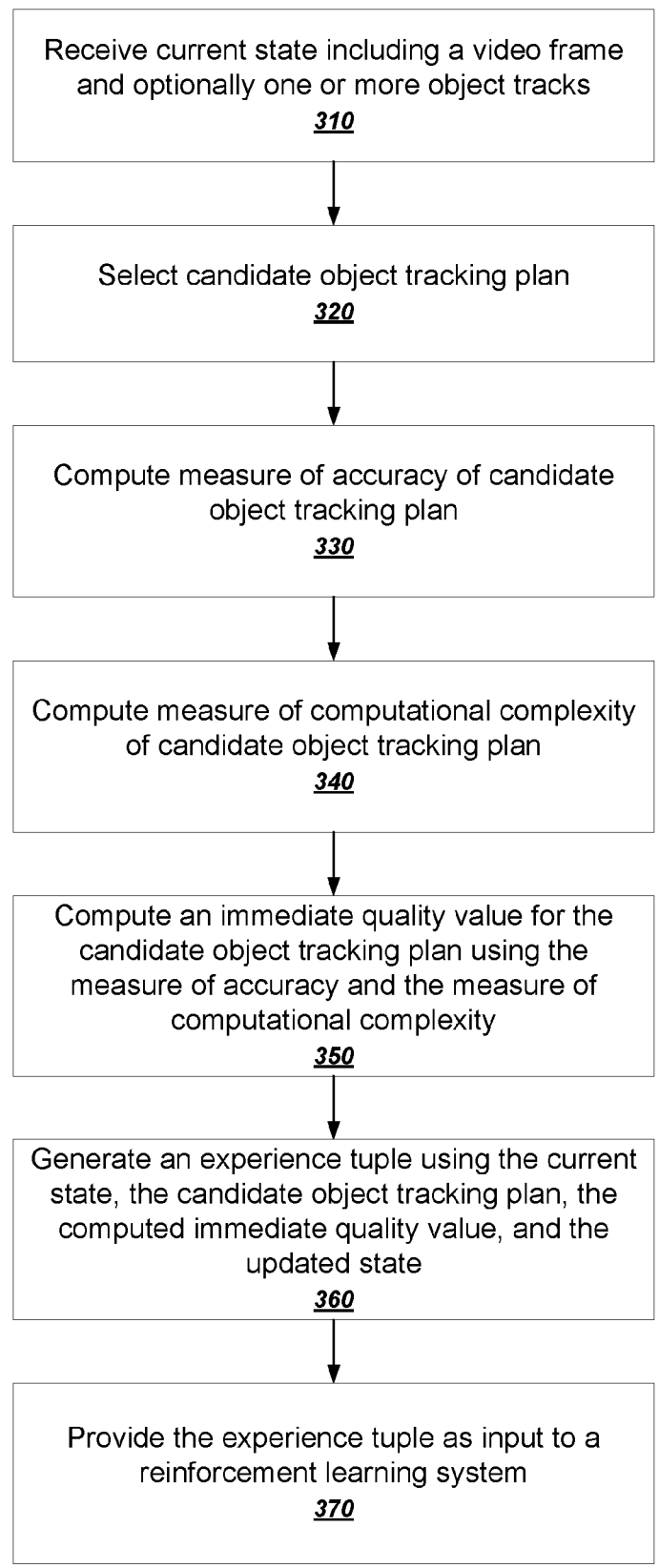
FIG. 3 is a flow chart of an example process for generating an experience tuple for training an object tracker policy.

FIG. 3 is a flow chart of an example process for generating an experience tuple for training an object tracker policy. In general, the system will seek to train a reinforcement learning model that generates, for a current state, an object tracking plan that provides at least a minimum level of accuracy at the lowest predicted computational complexity. For convenience, the example process will be described as being performed by a system of one or more computers located in one or more locations. For example, the system 200 of FIG. 2, appropriately programmed in accordance with this specification, can perform the example process.

The system receives a current state including a video frame and optionally one or more object tracks (310). The current state can be specified by labeled training data, which the system can use to gauge the accuracy of the candidate object trackers operating in different states.

The ground truth training data generally includes sequences of labeled video frames. Although the example process in FIG. 3 relates to generating an experience tuple for one video frame, in practice the system can iterate through each video frame in a sequence of video frames, generating an experience tuple for each video frame. Iterating through all video frames in the sequence also allows the system to simulate for complexities that arise when performing object tracking in real time. This is described in more detail below.

Each video frame in the training data can be labeled with object detections and corresponding object identifiers. For example, the training data can include a video frame that is labeled with bounding boxes indicating the locations of one or more objects in the video frame. The bounding boxes themselves can be associated with identifiers that serve to associate the detected objects with previously generated tracks for the objects detected in the video frames.

The ground truth training data can include hand-labeled training data that is manually generated as well as automatically generated training data. The hand-labeled training data is highly accurate, but it is time-consuming and expensive to compile. In contrast, the ground the automatically generated training data is cheaper to produce in mass quantities, but is usually less accurate than hand-labeled training data. The system can automatically generate training data by continually running the most sophisticated object tracker available on sample video frames. While performing such computationally expensive operations is generally not feasible in real-time on mobile devices, such data can feasibly be generated offline in a data center, which may contain hundreds or thousands of machines operating in parallel.

The system selects a candidate object tracking plan (320). The system can select a candidate object tracking plan by providing the current state as input to the reinforcement learning model. The current reinforcement learning model will produce a distribution of scores for one or more candidate object tracking plans. The system can then select the object tracking plan having the highest cumulative action score. Alternatively or in addition, the system can iterate through all candidate object tracking plans in order to generate respective experience tuples for each available object tracking plan.

In some implementations, the training data varies other object tracking parameters to be used when performing the object trackers. Varying these parameters can cause the reinforcement model to learn optimal parameters under varying conditions. For example, some object trackers have complexity settings that affect the accuracy and runtime of the tracker. As another example, the system can alter the resolution of the video frame in the training data. Lower resolution video frames are cheaper to process, but may result in less accurate tracking.

The system computes a measure of accuracy of the candidate object tracking plan (330). To compute a measure of accuracy, the system can perform the selected candidate object tracking plan on the particular video frame in the current state. In other words, the system can actually execute the one or more object tracker of the object tracking plan on the current video frame to generate one or more updated object tracks. The result of this process is an updated object track for the video frame that indicates a location of each detected object, e.g., by a bounding box, and that can associate each detection in the video frame with previously generated tracks in the current state.

The system can then compute the measure of accuracy by comparing the resulting updated object tracks to the ground truth training data. In general, the measure of accuracy rewards correctly updated object tracks and penalizes errors, which include false positive and false negative detections, erroneously swapped track identifiers, detections that have incorrect locations, or any other quantifiable errors.

For example, the system can increase the measure of accuracy by a positive reward value for each correctly tracked object. In some implementations, the positive reward value for correct tracks is proportional to the area of the intersection between the bounding boxes of the updated track and the ground truth track. In this context, increasing the measure of accuracy can include scaling by a particular value or adding a particular value. Likewise, decreasing the measure of accuracy can include scaling by a particular value or subtracting a particular value.

As another example, the system can decrease the measure of accuracy by a negative reward value for each mismatched track. The negative reward value for mismatches can similarly be proportional to the area of the intersection.

Additionally, the system can decrease the measure of accuracy by a negative reward value for each false positive. A false positive is a detection of an object track that is absent in the ground truth training data. In some implementations, the negative reward value for false positives is proportional to the area of the incorrectly identified object detection.

As another example, the system can decrease the measure of accuracy by a negative reward value for each false negative. A false negative is the absence of a detection of an object track that is present in the ground truth training data. In some implementations, the negative reward value for false negatives is proportional to the area of the missed object detection.

The system can also normalize the area computations above by a total area of the video frame or by an area of the object either in the ground truth training data or in the detections by the object tracker. Normalizing to the area of the video frame deemphasizes mistakes on smaller objects, while normalizing to the area of the object treats smaller objects more similarly to larger objects.

The system computes a measure of computational complexity of the candidate object tracking plan (340). To compute a measure of computational complexity on the target computing platform, the system can actually perform the selected candidate object tracking plan on the target computing platform. The system can then compute the computational complexity as a measure of the number of operations that were required, the time that was required, or some combination of these. Alternatively or in addition, the system can compute a simulated or a predicted cost that is based on known characteristics of the target computing platform.

The system can also normalize the measure of computational complexity by the time required to perform object detection. For example, the system can compute the measure of computational complexity $\text{reward}_{computation}$ using:

$$\text{reward}_{computation} = \frac{T_A}{T_D},$$

where $T_A$ is the time required to complete the selected action and $T_D$ is the time required to complete object detection. Because object detection is expected to be the most expensive computational task, normalizing to the cost of object detection has the practical effect of bounding the computational reward to a value between zero and one. And bounding the magnitude of rewards often results in faster training times for the model.

In some implementations, the system further penalizes the measure of computational complexity if the candidate object tracking plan did not execute within certain time parameters. For example, the system can require that the object tracking plan can complete within a time period corresponding to a particular number of video frames. This constraint helps to ensure that the resulting trained policy will be likely to choose object tracking plans that are able to provide real-time tracking. In some implementations, the system imposes a maximum computational budget and severely penalizes the measure of computational complexity if the selected candidate object tracking plan cannot meet the maximum computational budget. For example, the maximum computational budget can be computed as the maximum average cost per frame times the number of video frames in the sequence.

The system can also implement a more sophisticated approach that simulates operation of a frame buffer. For example, as the system iterates through video frames in the training data, the system can compute how the frame buffer of the target computing platform would fill up due to execution of the selected candidate object tracking plan. When the selected candidate object tracking plan is complete, the system can impose a positive reward on the measure of computational complexity by an amount proportional to the number of unfilled slots in the frame buffer. On the other hand, if the frame buffer overflows, the system can impose a large negative reward on the measure of computational complexity.

The system can also simulate thread parallelization by allowing cheaper object trackers to be run while a more expensive object tracker is running. For example, when iterating through the video frames, the system can simulate the following set of actions:

Frame T: extrapolate from T−1, perform sophisticated object detector
Frame T+1: extrapolate from T
Frame T+2: extrapolate from T+1
Frame T+3: extrapolate from T+2
Frame T+4: extrapolate from T+3
Frame T+5: visual track from sophisticated object detector becomes available and is associated with detection from T−1.

In this example, the more sophisticated object detector took five full video frames to execute. Rather than completely disallowing this approach due to time constraints, the system can default to the cheaper extrapolation object tracker during the time that the more sophisticated object tracker is executing.

The system computes an immediate quality value for the candidate object tracking plan using the measure of accuracy and the measure of computational complexity (350). In some implementations, the system can trade off the desired importance between the measure of accuracy and the measure of computational complexity by multiplying one or more of these by a particular parameter. For example, the immediate quality value v for a given video frame can be given by:

$$v = \text{reward}_{accuracy} + \lambda \times \text{reward}_{computation},$$

where $\text{reward}_{accuracy}$ is the measure of accuracy, reward computation is the measure of computational complexity, and the parameter $\lambda$ represents the importance of one factor relative to the other. In this equation, the measure of computational complexity is multiplied by the parameter $\lambda$, but the measure of accuracy, or both factors, could also be multiplied by respective factors.

The system generates an experience tuple using the current state, the candidate object tracking plan, the computed immediate quality value, and the resulting updated state (360).

The system provides the experience tuple as input to a reinforcement learning system (360). The reinforcement learning system will then use the experience tuple to generate a cumulative action score that represents the long-term expected outcome of performing the candidate object tracking plan on the target computing platform in the current state. The system can then update the reinforcement learning model using the results of this computation.

Because the computational characteristics of different target computing platforms will affect which object tracking plans are optimal, the system can train a different respective model for each of a number of different target computing platforms. Although this increases the training time, the training process is the same for each target computing platform. Thus, once the training data has been generated, all of the required models for all the different target computing platforms can be generated automatically. This provides a notable speedup over the process of using hand-designed policies, in addition to being generally more accurate and more efficient for the target computing platform.

Figure 4:
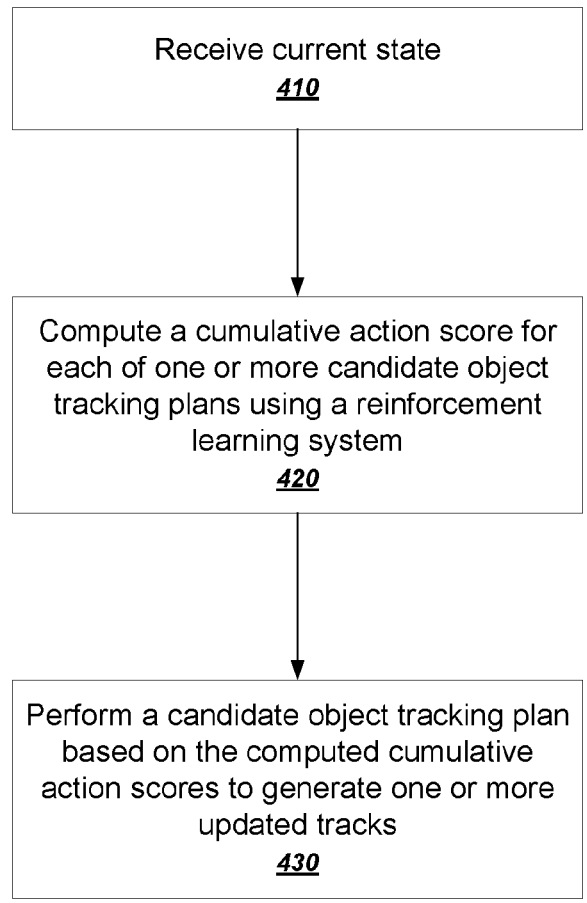
FIG. 4 is a flow chart of an example process for selecting an object tracking plan.

FIG. 4 is a flow chart of an example process for selecting an object tracking plan. For convenience, the example process will be described as being performed by a system of one or more computers. For example, the system 200 of FIG. 2, appropriately programmed in accordance with this specification, can perform the example process.

The system receives a current state (410). As described above, the current state includes a current video frame and possibly previously generated object tracks.

The system computes a cumulative action score for each of one or more candidate object tracking plans using a reinforcement learning system (420). For example, the system can use the state value function engine trained using the process described above with reference to FIG. 3 to generate a cumulative action score for each of one or more candidate object tracking plans.

The system performs a candidate object tracking plan based on the computed cumulative action scores to generate one or more updated tracks (430). For example, the system can select a candidate object tracking plan that resulted in the highest cumulative action score. Alternatively, the system can perform additional evaluations of actions having sufficiently high cumulative action scores and select based on those additional evaluations.

For example, the system can initially discard any candidate object tracking plans that do not have cumulative action scores that satisfy a threshold. The system can further evaluate the remaining candidate object tracking plans based on other factors.

The example techniques described above used the cumulative action scores as part of a value-based reinforcement learning approach. However, policy-based methods, or a combination of policy-based and value-based methods can also be used. For example, instead of the system training a model that outputs a score for a particular object tracking plan, the system can use a policy-based approach to train a model that outputs one or more actions to take along with their corresponding probabilities. In this policy-based approach, the probabilities represent a likelihood that the corresponding action will maximize the long-term reward if performed.

Policy-based approaches can also be beneficial when applied to continuous action spaces. For example, instead of training a model to output discrete sets of actions, a policy-based approach can train a model for continuous action spaces. For example, the continuous action space can include values of internal parameters of the object trackers. Alternatively or in addition, a continuous action space can include regions of interest on which to run an object tracker. For example, for a given particular video frame, a policy-based model can output a set of parameters, the coordinates of a region within the video frame, or both.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
receiving a current video frame by a user device having a plurality of installed object trackers, wherein each object tracker is configured to perform a different object tracking procedure on the current video frame;
obtaining, by the user device, one or more object tracks previously generated by one or more of the plurality of installed object trackers;
providing (i) the current video frame and (ii) the one or more object tracks previously generated by the one or more object trackers as input to a trained policy engine that implements a reinforcement learning model to generate a particular object tracking plan,
wherein the reinforcement learning model is trained to use the current video frame and the one or more object tracks to generate an object tracking plan based on a predicted measure of accuracy and a predicted measure of computational complexity of the object tracking plan, each object tracking plan comprising data representing one or more object trackers to be performed on the current video frame;
selecting, by the user device, a particular object tracking plan based on the output of the reinforcement learning model; and
performing, by the user device, the selected object tracking plan on the current video frame to generate one or more updated object tracks for the current video frame.

Embodiment 2 is the method of embodiment 1, wherein the reinforcement learning model is a value-based reinforcement model that outputs a cumulative action score for each of one or more object tracking plans based on the predicted measure of accuracy and the predicted measure of computational complexity of each of the one or more object tracking plans.

Embodiment 3 is the method of embodiment 1, wherein the reinforcement learning model is a policy-based reinforcement model that outputs a probability for each of one or more object tracking plans or a probability for each of a set of object tracking parameters.

Embodiment 4 is the method of any one of embodiments 1-3, wherein the reinforcement learning model is trained to generate a candidate object tracking plan having at least a threshold measure of accuracy at a lowest predicted computational complexity.

Embodiment 5 is the method of any one of embodiments 1-4, wherein generating the particular object tracking plan from the reinforcement model and performing the particular object tracking plan on the current video frame occurs in real time.

Embodiment 6 is the method of any one of embodiments 1-5, further comprising training the reinforcement model including:
receiving one or more training sequences of video frames, wherein each video frame in each sequence is labeled with object tracking information;
obtaining, for a current state comprising a particular video frame, a candidate object tracking plan;
performing the candidate object tracking plan on the particular video frame to generate an updated state comprising one or more particular object tracks;
computing a measure of accuracy for the candidate object tracking plan by comparing the one or more particular object tracks generated by the candidate object tracking plan to labeled object tracking information of the particular video frame;
computing a measure of computational complexity for the candidate object tracking plan for a target computing platform;
computing an immediate quality value for the candidate object tracking plan using the computed measure of accuracy and the computed measure of computational complexity;

generating an experience tuple comprising the current state, the candidate object tracking plan, the immediate quality value, and the updated state; and updating the reinforcement model using the generated experience tuple.

Embodiment 7 is the method of embodiment 6, wherein computing the measure of accuracy for the candidate object tracking plan comprises increasing the measure of accuracy by a positive reward value for each correctly tracked object.

Embodiment 8 is the method of embodiment 7, further comprising computing the positive reward value to be proportional to an area of the intersection between a first object detection generated by the candidate object tracking plan and a second object detection in the training data Embodiment 9 is the method of embodiment 6, wherein computing the measure of accuracy for the candidate object tracking plan comprises decreasing the measure of accuracy by a negative reward value for each mismatched track, each false positive, or each false negative.

Embodiment 10 is the method of any one of embodiments 1-9, wherein each object tracking plan identifies one or more of a plurality of different object trackers.

Embodiment 11 is the method of embodiment 10, wherein the plurality of object trackers include a first object tracker that performs object detection and a second object tracker that performs visual tracking without performing object detection.

Embodiment 12 is the method of embodiment 11, wherein the second object tracker that performs visual tracking comprises a neural network object tracker, a correlation filter, a neural network bounding box regressor, or an optical flow-based tracker.

Embodiment 13 is a system comprising: one or more computers and one or more storage devices storing instructions that are operable, when executed by the one or more computers, to cause the one or more computers to perform the method of any one of embodiments 1 to 12.

Embodiment 14 is a computer storage medium encoded with a computer program, the program comprising instructions that are operable, when executed by data processing apparatus, to cause the data processing apparatus to perform the method of any one of embodiments 1 to 12.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method comprising:

receiving a current video frame by a user device having a plurality of installed object trackers, wherein each object tracker is configured to perform a different object tracking procedure on the current video frame;

obtaining, by the user device, a plurality of object tracks previously generated by one or more of the plurality of installed object trackers, wherein each object track specifies a different respective region of a previous video frame in which a respective object was detected;

providing (i) the current video frame and (ii) the plurality of object tracks previously generated by one or more of the object trackers as input to a trained policy engine that implements a reinforcement learning model to generate a particular object tracking plan, wherein the reinforcement learning model is trained to use the current video frame and the plurality of object tracks to generate an object tracking plan based on a predicted measure of accuracy and a predicted measure of computational complexity of the object tracking plan, each object tracking plan comprising data representing a set of object trackers to be performed on the current video frame;

receiving an output of the reinforcement learning model representing an object tracking plan having a plurality of different object trackers to be applied to different respective regions of the current video frame based on the plurality of object tracks; and performing, by the user device, the object tracking plan on the current video frame to generate one or more updated object tracks for the current video frame.

2. The method of claim 1, wherein the reinforcement learning model is a value-based reinforcement learning model that outputs a cumulative action score for each of one or more object tracking plans based on the predicted measure of accuracy and the predicted measure of computational complexity of each of the one or more object tracking plans, and further comprising selecting the object tracking plan among a plurality of object tracking plans based on a respective cumulative action score for each of the object tracking plans.

3. The method of claim 1, wherein the reinforcement learning model is a policy-based reinforcement learning model that outputs a probability for each of one or more object tracking plans or a probability for each of a set of object tracking parameters.

4. The method of claim 1, wherein the reinforcement learning model is trained to generate a candidate object tracking plan having at least a threshold measure of accuracy at a lowest predicted computational complexity.

5. The method of claim 1, further comprising generating the particular object tracking plan from the reinforcement learning model and performing the particular object tracking plan on the current video frame occurs in real time.

6. The method of claim 1, further comprising training the reinforcement learning model including:
receiving one or more training sequences of video frames, wherein each video frame in each sequence is labeled with object tracking information;
obtaining, for a current state comprising a particular video frame, a candidate object tracking plan;
performing the candidate object tracking plan on the particular video frame to generate an updated state comprising one or more particular object tracks;
computing a measure of accuracy for the candidate object tracking plan by comparing the one or more particular object tracks generated by the candidate object tracking plan to labeled object tracking information of the particular video frame;
computing a measure of computational complexity for the candidate object tracking plan for a target computing platform;
computing an immediate quality value for the candidate object tracking plan using the computed measure of accuracy and the computed measure of computational complexity;
generating an experience tuple comprising the current state, the candidate object tracking plan, the immediate quality value, and the updated state; and
updating the reinforcement learning model using the generated experience tuple.

7. The method of claim 6, wherein computing the measure of accuracy for the candidate object tracking plan comprises increasing the measure of accuracy by a positive reward value for each correctly tracked object.

8. The method of claim 7, further comprising computing the positive reward value to be proportional to an area of the intersection between a first object detection generated by the candidate object tracking plan and a second object detection in the one or more training sequences.

9. The method of claim 6, wherein computing the measure of accuracy for the candidate object tracking plan comprises decreasing the measure of accuracy by a negative reward value for each mismatched track, each false positive, or each false negative.

10. The method of claim 1, wherein each object tracking plan identifies a plurality of different object trackers.

11. The method of claim 10, wherein the plurality of object trackers include a first object tracker that performs object detection and a second object tracker that performs visual tracking without performing object detection.

12. The method of claim 11, wherein the second object tracker that performs visual tracking comprises a neural network object tracker, a correlation filter, a neural network bounding box regressor, or an optical flow-based tracker.

13. A system comprising: one or more computers and one or more storage devices storing instructions that are operable, when executed by the one or more computers, to cause the one or more computers to perform operations comprising:
receiving a current video frame by a user device having a plurality of installed object trackers, wherein each object tracker is configured to perform a different object tracking procedure on the current video frame;
obtaining, by the user device, a plurality of object tracks previously generated by one or more of the plurality of installed object trackers, wherein each object track specifies a different respective region of a previous video frame in which a respective object was detected;
providing (i) the current video frame and (ii) the plurality of object tracks previously generated by one or more of the object trackers as input to a trained policy engine that implements a reinforcement learning model to generate a particular object tracking plan,
wherein the reinforcement learning model is trained to use the current video frame and the plurality of object tracks to generate an object tracking plan based on a predicted measure of accuracy and a predicted measure of computational complexity of the object tracking plan, each object tracking plan comprising data representing a set of object trackers to be performed on the current video frame;
receiving an output of the reinforcement learning model representing an object tracking plan having a plurality of different object trackers to be applied to different respective regions of the current video frame based on the plurality of object tracks; and
performing, by the user device, the object tracking plan on the current video frame to generate one or more updated object tracks for the current video frame.

14. The system of claim 13, wherein the reinforcement learning model is a value-based reinforcement learning model that outputs a cumulative action score for each of one or more object tracking plans based on the predicted measure of accuracy and the predicted measure of computational complexity of each of the one or more object tracking plans, and further comprising selecting the object tracking plan among a plurality of object tracking plans based on a respective cumulative action score for each of the object tracking plans.

15. The system of claim 13, wherein the reinforcement learning model is a policy-based reinforcement learning model that outputs a probability for each of one or more object tracking plans or a probability for each of a set of object tracking parameters.

16. The system of claim 13, wherein the reinforcement learning model is trained to generate a candidate object tracking plan having at least a threshold measure of accuracy at a lowest predicted computational complexity.

17. The system of claim 13, further comprising generating the particular object tracking plan from the reinforcement learning model and performing the particular object tracking plan on the current video frame occurs in real time.

18. The system of claim 13, wherein the operations further comprise training the reinforcement model including:
receiving one or more training sequences of video frames, wherein each video frame in each sequence is labeled with object tracking information;
obtaining, for a current state comprising a particular video frame, a candidate object tracking plan;
performing the candidate object tracking plan on the particular video frame to generate an updated state comprising one or more particular object tracks;
computing a measure of accuracy for the candidate object tracking plan by comparing the one or more particular object tracks generated by the candidate object tracking plan to labeled object tracking information of the particular video frame;
computing a measure of computational complexity for the candidate object tracking plan for a target computing platform;
computing an immediate quality value for the candidate object tracking plan using the computed measure of accuracy and the computed measure of computational complexity;

generating an experience tuple comprising the current state, the candidate object tracking plan, the immediate quality value, and the updated state; and updating the reinforcement learning model using the generated experience tuple.

19. The system of claim 18, wherein computing the measure of accuracy for the candidate object tracking plan comprises increasing the measure of accuracy by a positive reward value for each correctly tracked object.

20. One or more non-transitory computer storage media encoded with computer program instructions that when executed by one or more computers cause the one or more computers to perform operations comprising:

receiving a current video frame by a user device having a plurality of installed object trackers, wherein each object tracker is configured to perform a different object tracking procedure on the current video frame;

obtaining, by the user device, a plurality of object tracks previously generated by one or more of the plurality of installed object trackers, wherein each object track specifies a different respective region of a previous video frame in which a respective object was detected;

providing (i) the current video frame and (ii) the plurality of object tracks previously generated by one or more of the object trackers as input to a trained policy engine that implements a reinforcement learning model to generate a particular object tracking plan, wherein the reinforcement learning model is trained to use the current video frame and the plurality of object tracks to generate an object tracking plan based on a predicted measure of accuracy and a predicted measure of computational complexity of the object tracking plan, each object tracking plan comprising data representing a set of object trackers to be performed on the current video frame;

receiving an output of the reinforcement learning model representing an object tracking plan having a plurality of different object trackers to be applied to different respective regions of the current video frame based on the plurality of object tracks; and performing, by the user device, the object tracking plan on the current video frame to generate one or more updated object tracks for the current video frame.

\* \* \* \* \*